Figure 1:
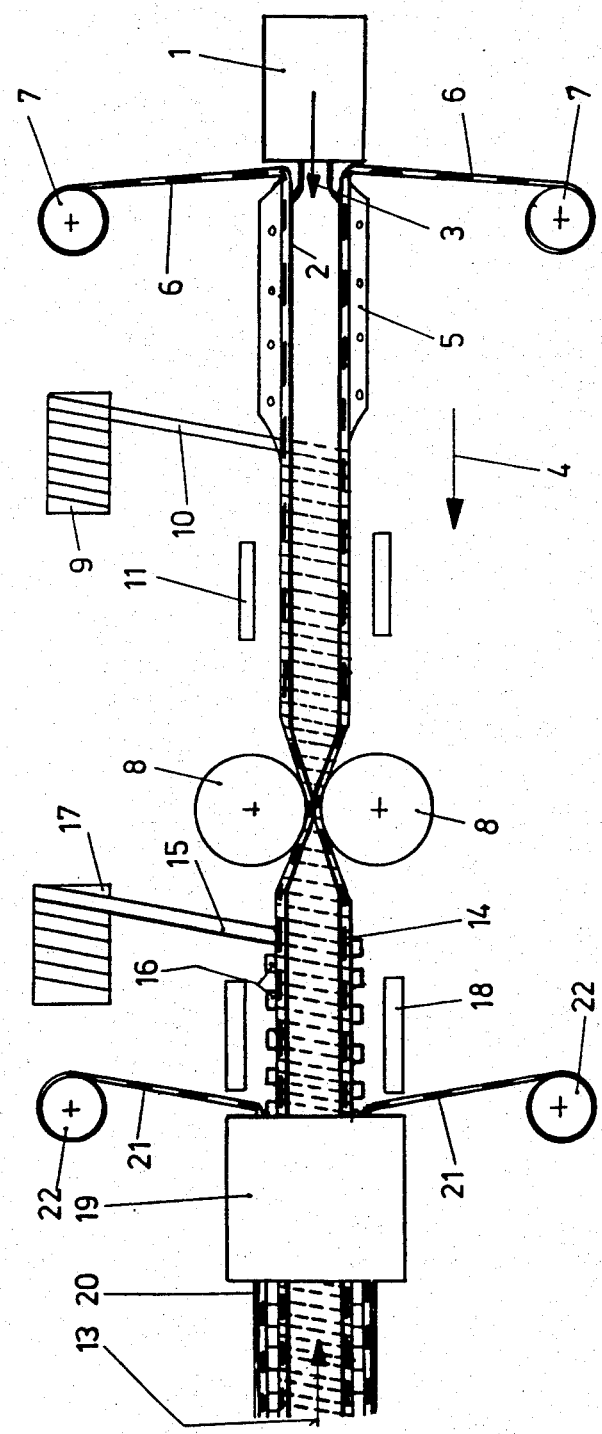

United States Patent [19]
Vohrer

[11] Patent Number: 4,495,018
[45] Date of Patent: Jan. 22, 1985

[54] PROCESS FOR PRODUCING A REINFORCED TUBE

[76] Inventor: Christoph Vohrer, Hattsteiner Str. 22, D, 6420 Konigstein 2, Fed. Rep. of Germany

[21] Appl. No.: 514,154

[22] Filed: Jul. 14, 1983

[30] Foreign Application Priority Data

Jul. 21, 1982 [DE] Fed. Rep. of Germany ....... 3227166

[51] Int. Cl.³ .............................................. B31C 3/00
[52] U.S. Cl. ..................................... 156/187; 156/172; 156/195; 156/244.13; 156/244.14; 156/244.15; 156/287; 156/428; 156/430
[58] Field of Search ............... 156/195, 244.11, 244.13, 156/244.15, 425, 428–432, 287, 172, 171, 187–188

[56] References Cited

U.S. PATENT DOCUMENTS

| Re. 27,355 | 5/1972 | Skoggard | 156/432 |
| 2,723,705 | 11/1955 | Collins | 156/195 X |
| 3,336,176 | 8/1967 | Medney | 156/431 X |
| 3,437,537 | 4/1969 | Takada | 156/244.14 X |
| 3,503,828 | 3/1970 | Walter | 156/432 X |
| 3,769,127 | 10/1973 | Goldsworthy | 156/430 X |

FOREIGN PATENT DOCUMENTS

| 1629830 | 1/1971 | Fed. Rep. of Germany . |
| 2121146 | 11/1972 | Fed. Rep. of Germany . |
| 2261126 | 8/1974 | Fed. Rep. of Germany . |
| 2700056 | 6/1978 | Fed. Rep. of Germany . |
| 3017326 | 11/1981 | Fed. Rep. of Germany . |

Primary Examiner—David Simmons

[57] ABSTRACT

Process of making a reinforced tube including extruding a thin walled tube, encircling the tube with a completely closed layer of helically extending strip coated with heat activatable adhesive material. The tube is then passed through a sizing die heated at its entrance to activate the adhesive while subjecting the tube to relatively low internal pressure to bond the tube to the layer of strips. The integrally connected tube and strips are then passed through pinch rolls which close the tube and maintain the pressure upstream from the rolls different from the downstream pressure. Further reinforcing strips and an outer sheath are thereafter provided.

12 Claims, 5 Drawing Figures

PROCESS FOR PRODUCING A REINFORCED TUBE

DESCRIPTION

The invention relates to a process for producing a reinforced tube.

In thin-walled and therefore light-weight and flexible reinforced tubes, reinforcing elements extending essentially in an axial direction are preferably applied over the entire periphery of the thin inner tube (German Offenlegungsschrift No. 2,261,126). Wire turns and parallel strips made of relatively hard thermoplastic or elastomeric material are wound helically over the reinforcing elements. The inner tube, strips and outer tube are connected firmly to one another. The reinforcing elements may consist of strips of PVC reinforced with textile threads (German Offenlegungsschrift No. 1,629,830). These PVC strips can be connected to the other PVC components of the tube, so that the strips appear as a continuous layer in the tube wall. Production of these tubes presents no problems when it is carried out on a production mandrel over which the inner tube is extruded, since this production mandrel can absorb directly the winding stresses which the stiff reinforcing strips or wire turns generate.

A method of manufacturing a thin-walled tube with spiral armoring has been proposed which avoids the known disadvantages of production mandrels which are also designated as production assistance mandrels. By this method, the thin-walled tube is fed through a cylindrical guide while the tube is maintained under internal pressure. Spiral armoring is fed onto the outside of the guide and several turns of the armoring are accumulated on the guide. Pressure is applied lengthwise of the guide against the last accumulated turn, so that as the tube leaves the guide, the foremost turn slides off the guide onto the periphery of the tube. (German Auslegeschrift No. 2,700,056). However, it has been shown here that even relatively slight fluctuations in the internal pressure of the inner tube can have an adverse effect on the regularity of the turns. Expensive pressure regulation is therefore necessary.

In addition to the absorption of the windng stresses by the inner tube, a further problem is the bonding of the inner tube, a supporting spiral which is present if appropriate, and the outer tube. This bonding is usually carried out by activating an adhesive by supplying heat. This is the case, for example, with a flexible reinforced plastic tube having an inner tube, an outer tube made of plastomeric or elastomeric material and a reinforcing strip extending spirally between the inner tube and the outer tube and consisting of relatively hard material. The turns of the spiral may be axially spaced. The reinforcing strip may be provided with a sheathing made of a relatively soft plastomeric or elastomeric material and that sheathing may be connected firmly to the inner tube and to the outer tube (German Offenlegungsschrift 3,017,326). At the same time, the inner tube may be provided on its outside with reinforcing elements, preferably textile threads, extending essentially axially, and the sheathed reinforcing strip can be bonded to the inner tube over them. Here too, PVC strips reinforced with textile threads can be used as reinforcing elements. However, an adverse effect may be encountered when the inner tube, supporting spiral and outer tube are bonded together, if too high a temperature is used for reactivating the adhesive, which can be applied to the inner tube or to the supporting spiral. That adverse effect is that under the internal pressure the inner tube may be pressed between the turns of the supporting spiral, be deformed three-dimensionally and in an extreme case even burst. The finished tube thus exhibits permanent buckling and a rough inner wall. On the other hand, the temperature for bonding should not be too low, since otherwise sufficient adhesion between the inner tube, the supporting spiral and the outer tube is not obtained. If, in order to overcome the difficulties mentioned above, an adhesive is used which acquires adhesive capacity at relatively low temperatures as result of reactivation, then the finished tube should not be used subsequently at higher temperatures. This results in a substantial restriction to the practical use of such tubes which are thus not permitted to carry hot water for a long period of time.

The prior art also includes a process for producing a composite tube consisting of a woven-fabric tube with an inner tube made of rubber or plastic, in which the inner casing is coated with adhesive and is fed continuously to the woven-fabric tube during the operation of weaving the latter, and is carried along in the woven-fabric tube. The tube blank formed in this way is heated over a heating stage to activate the adhesive. During the heating operation, the inner tube is subjected to internal pressure, thereby expanding the tube. Subsequently the pressure is relieved (German Offenlegungsschrift No. 2,121,146). However, this production process is relatively slow and expensive because of the operation of weaving the woven-fabric tube. Furthermore, the woven-fabric tube builds up to a considerable extent, so that the tube wall is relatively thick and prevents the desired fold formation. A further coating of adhesive would be necessary for further tube construction.

The object of the present invention is, therefore, to produce a reinforced tube without using a production mandrel, by first reinforcing an inner tube in a suitable way, so that a pressure-resistant and heat-resistant lightweight flexible reinforced tube can be built up on the inner tube simply by using only inexpensive production means.

The inner tube is made of thermoplastic or elastomeric material, the wall thickness of which is 0.3–0.5 mm. This inner tube is subjcted to a relatively low internal pressure, which, however, is sufficiently greater than the ambient external pressure to expand the tube. A first layer of reinforcing strips is then applied in an axial direction between the inner tube and an encircling guide. The second layer of reinforcing strips is then wound spirally on the reinforced inner tube after it leaves the guide. The strips of the second layer are bonded immediately by heating to the first layer of reinforcing strips. This results in a doubly reinforced tube which can withstand relatively high internal pressures directly without the need for a production assistance mandrel. Consequently, it is possible to apply such a relatively high internal pressure to the tube so that especially resistant armoring, such as supporting spirals, in the form of relatively stiff strips or wires can be applied to this reinforced tube. Instead of the armoring, an outer tube can alternatively be extruded directly onto the reinforced tube. The internal pressure of the reinforced tube can amount to 20 bar and above. It is not necessary, but nevertheless possible, to attach the supporting spiral to the reinforced inner tube with as little tension as possible.

Strips which can be used for reinforcing the inner tube are those which consist of PVC and are provided throughout their entire cross-section with finely distributed embedded textile fibers. These strips can be coated thinly on both sides with adhesives, preferably solvent adhesives. This does away, in an advantageous way, with the necessity of adhesively coating the inner tube for subsequently attaching it to an enveloping spiral or sheath.

Instead of the strips coated with adhesive, it is possible to use, in an especially advantageous way, strips in which untwisted yarn is guided through and coated with a heated high-viscosity hot-melt adhesive, preferably on a copolyamide base, instead of PVC paste. Subsequently, this coated yarn is rolled flat to form the strips. The strips possess, without further coating, the desired adhesive properties, namely an adhesive capacity at between 130° and 150° C., with the resulting bond becoming firm upon cooling to a temperature range of 100° to 110° C.

The strips preferably have a width of approximately 3 mm and a thickness of 0.05 to 0.1 mm. They are as soft and as flexible as possible, so that they do not impede the formation of folds to facilitate bending of the inner tube and the outer tube.

The strips become adhesive at the extrusion temperature of the thin-walled inner tube. That tube is expanded under pressure against the strips, which adhere quickly to the tube. An axial driving force applied to the strips is therefore effective to transport the tube along with the strips. These parallel axial strips abut one another and may even overlap one another in the most favorable case. These strips reinforce the inner tube to such an extent that the latter withstands winding stresses with a relatively low internal pressure. It therefore becomes possible to wind a second layer of the same strip spirally over it. The composite tube consisting of the inner tube reinforced axially and spirally by strips now withstands such high pressures and temperatures that it resists the forces incidental to the further application of tube armoring in the form of rigid supporting spirals. There is therefore no need for a supporting mandrel. The strip layers act between the inner tube and the further tube construction as an adhesion promoter which can be activated easily at readily achievable temperatures.

An especially resistant reinforcement for the tube may be produced by winding a third layer spirally over the second layer and in the opposite direction. In this way, distortion of the inner tube by the intended internal pressure is reliably prevented. The inner tube reinforced in this way can therefore subsequently be subjected without difficulty to a relatively high internal pressure for winding on a supporting spiral, which is then heated and finally provided with an extruded outer tube.

The temperature range in which the adhesive used for producing or for coating the strip acquires adhesive capacity is preferably coordinated with the outlet temperature of the inner tube when it emerges from the extrusion nozzle. A material which becomes adhesive in the range between 130° and 150° C., is preferably used for this purpose.

After adhesion, the resulting bond is cured to substantial working strength by cooling to 100° C.

A reinforced tube constructed in accordance with the invention may be provided with an outer sheath by extruding thereon a thin layer of PVC with a thickness of 0.2 to 0.3 mm. This plastic bonds well to the outermost layer of strips of the reinforced inner tube, since the extrusion temperature is above the melting point of the adhesive on the strip. This adhesive is selected in accordance with the preferred specifications mentioned above. A very light-weight, but extremely pressure-resistant resistant composite tube is thus obtained. Even if the diameter is relatively large the tube can be laid flat for transport and storage and can therefore be coiled up in a space-saving way. However, if the wall thickness of the outer tube is relatively thick, the tube cross-section can remain round even under bending stress.

A reinforced tube which is light-weight, but especially resistant to pressure and bending stress can be produced, without using an assistance mandrel, by means of a supporting spiral made of relatively stiff material and bonded both to the reinforced inner tube and the extruded sheath.

The adhesive strips can also be used to connect the supporting spiral to an outer tube extruded over it. As a result of the outer tube as a sheathing over the supporting spiral, the tube is protected additionally against external effects and the surface is made smooth.

A further reinforcement of the tube can advantageously be achieved by means of the same strips if these are applied tautly to the supporting spiral in an axial direction before the outer tube is extruded and are connected to the supporting spiral without the use of an additional adhesion promoter. Advantageously, these additional strips are applied to the inner tube reinforced with the supporting spiral, as that reinforced tube approaches the crosshead which is used for extrusion and by means of which sheathing is carried out. The textile-reinforced strips serve, here again, as an adhesion promoter between the supporting spiral and the outer tube in order to improve the connection between them. Moreover, the strips absorb forces during the stretching and compression of the tube as a result of bending and thus prevent tearing in the region of folding. In addition, the protection against external mechanical damage is improved.

Folding inwards, that is to say between the turns of the supporting spiral, is obtained forcibly because the outer tube is usually applied in such a way that a partial vacuum is established in the sheathing-extrusion head. It causes the outer tube to fit closely against the existing tube construction.

The result of this inward folding is, in turn, that the distance (clearance) between the supporting spirals is reduced by at least double the wall thickness of the outer tube, and consequently the bending radius of the tube is increased considerably, that is to say flexibility is impaired.

If the strips are applied tautly, they prevent the ductile outer tube from being drawn in between the supporting spirals under the effect of the necessary vacuum. The gap between the supporting spirals remains free, and folding during the bending of the tube takes place forcibly outwards. The finished tube has a very small bending radius and is therefore highly flexible.

A spiral cavity is defined by the distance between the turns and the height of the supporting spirals, the reinforced inner tube and the outer tube lying tautly over the spiral and reinforced with strips.

This spiral cavity is protected on all sides and can be used as an additional conveyor in the tube for other liquid or gaseous media.

The composite tube produced according to the processes mentioned above thus has numerous advantages. In particular, the tube can be especially heat-resistant since it is possible to use adhesives which are reactivated only at relatively high temperatures.

In the manufacture of this composite tube, there is practically no danger that the inner tube will burst because of the internal pressure, with the result that continuous production of the composite tube would be interrupted.

Figure 2:
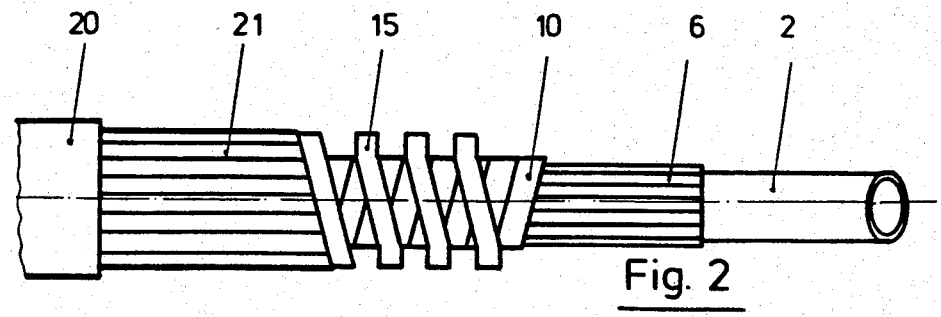
Figure 3:
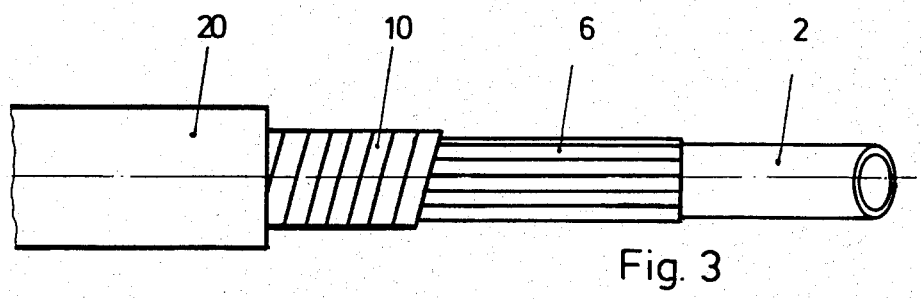
Figure 4:
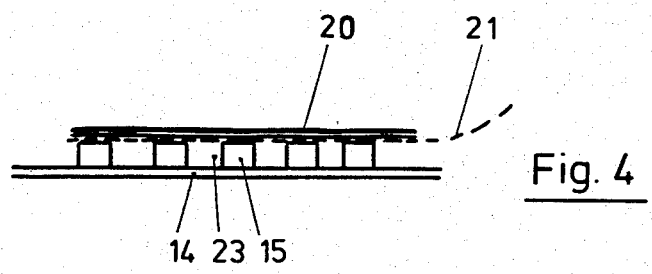
Figure 5:
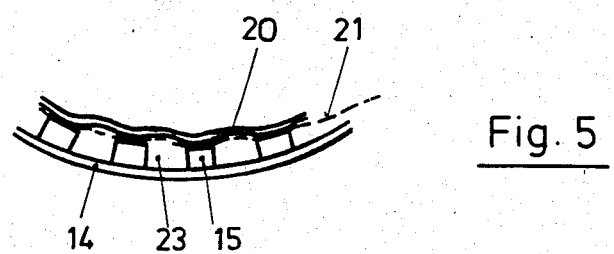

The invention is explained in more detail below with reference to the drawings in which:

FIG. 1 shows somewhat diagrammatically, an apparatus for carrying out the process of the invention, FIG. 2 shows the composite structure of a tube produced by means of the apparatus according to FIG. 1, FIG. 3 shows an alternative form of the composite tube, FIG. 4 shows a longitudinal sectional view, partly diagrammatic, of one wall of the composite tube according to FIG. 2, in particular the arrangement of the strips in a longitudinal direction on the supporting spiral, with the tube being straight, and FIG. 5 shows a sectional view similar to FIG. 4, but with the tube bent.

In FIG. 1, 1 denotes an extrusion nozzle from which an inner tube 2 made of PVC with a wall thickness of 0.3 to 0.5 mm is extruded. The inner tube 2, which is subjected by the extrusion nozzle to an internal pressure indicated by the arrow 3, first passes, in the production direction indicated by the arrow 4, into a pipe or sizing guide 5 and is expanded against the inner wall of the latter. Before the tube 2 enters the pipe, textile-reinforced strips 6 consisting of a hot-melt adhesive are brought up to the inner tube in an axial direction, that is to say parallel to the direction of transport. For this purpose, the strips are drawn off from suppy rolls 7 arranged concentrically around the pipe 5.

The inner tube together with the strips is transported in the production direction 4 through draw-off and pinching rolls 8. The draw-off and pinching rolls flatten the inner tube 2 and the strips 6 applied to it and thus form a seal for maintaining the internal pressure.

The inner tube subjected to the internal pressure, together with the strips running in an axial direction, is pressed against the pipe 5 on the inside and immediately forms a close bond with the strips, since the temperature of the inner tube when it emerges from the extrusion nozzle 1 activates the adhesive strips 6.

The pipe 5 serves to set the outside diameter of the tube and also as a pressing zone in which the strips 6 are pressed onto the inner tube 2. It moreover cools the inner tube 2 to such an extent that the connection between the strips and the inner tube becomes firm. Furthermore, air can be blown into the pipe interior, outside the strips 6, in order to reduce the friction between the strips 6 and the inner face of the pipe 5. This flow of air forms a pneumatic cushion between the strips 6 and the pipe 5.

The longitudinal strips 6 connected to the inner tube 2 in the pipe 5 cover the surface of the inner tube and may even overlap one another somewhat at the edges. In this way, the inner tube reinforced in a longitudinal direction with the strips withstands the limited internal pressure of 0.5 to approximately 1 bar even after it has emerged from the pipe. The internal pressure stiffens the reinforced tube 2, so that at least one further strip 10 may be wound spirally over the layer of axial strips 6, as soon as the inner tube has left the pipe 5. Because of the internal pressure, the tube 2 is not constricted by the spirally wound strip 10. The device for applying the strip 10 in spiral form is designated by 9.

After the strip 10 has been wound on in spiral form, the inner tube passes through a first heating zone 11 in which the textile-reinforced strip 10 made of hot-melt adhesive is connected firmly to the strips 6.

After passing through the draw-off and pinching rolls 8, the inner tube 2 reinforced with the strips 6 and 10 is subjected, from the coiling-up side, to an increased internal pressure which is indicated by the arrow 13. The internal pressure can amount to 20 bar. It is propagated through the inner tube 2 up to the draw-off and pinching rolls 8. The composite tube structure, consisting of inner tube 2 and reinforcing strips 6 and 10, is hereinafter identified by the reference numeral 14.

Following the draw-off and pinching rolls 8 in the direction of transport, a supporting spiral 15 is wound, with distances 16 between the turns, onto the composite tube 14. The supporting spiral 15 is produced from a plastic strip which has a preferably rectangular cross-section and which is wound from a winding device 17 onto the composite tube which is under internal pressure. The composite tube supported by the relatively high internal pressure thus withstands the relatively high winding stress of the winding device 17 without undue deformation, so that there is no need for expensive means to relieve that stress.

The composite tube reinforced by means of the supporting spiral 15 now passes through a second heating zone 18. Here, the adhesive property of the material of the strips 10 is activated to such an extent that the supporting spiral is connected firmly to the strips, without the need to apply an adhesion agent to the composite tube or the supporting spiral.

An outer sheath 20 is formed over the strengthened and reinforced inner tube as the latter passes in the production direction through a crosshead with an extrusion nozzle 19. The inner face of the sheath 20 is strengthened by further strips 21 of hot-melt adhesive which are drawn off from supply rollers 22 and applied in an axial direction to the reinforced inner tube by running them into the extrusion nozzle 19 over the supporting spiral 15.

When the strips 21 are applied tautly to the supporting spiral 15, so that they do not sag when the tube is extended (see the longitudinal section through the tube wall according to FIG. 4), the sheath 20 and strips 21 bulge outwardly between the turns of the spiral 15 when the tube is bent, see FIG. 5.

However, when the strips 21 are applied to the supporting spiral practically without tension, that is to say loosely before they are connected to it, then the sheath 20 and strips 21 fold inwardly between the turns of the spiral 15 as the tube is bent.

In either case, a secure connexion between the supporting spiral 15 and the outer tube 20 is achieved, without further adhesion means, by the strips 21, which as mentioned above, are made with hot-melt adhesive.

FIG. 2 shows, by means of parts of the composite tube which have been removed in steps in the periphery, the reinforced tube produced as described above, with a supporting spiral.

FIG. 3 shows, in a similar representation, a tube produced in a comparable way, but without a supporting spiral and additional strips. Here the sheath 20 is applied and bonded directly onto the strips 10 which reinforce the inner tube 2.

I claim:

1. A process for producing a reinforced tube which has a thin-walled inner tube and an outer sheath made of thermoplastic or elastomeric material as well as thin strips which extend in an axial direction on the outside of the inner tube and are reinforced with textile threads and which consist of plastic connectable to the material of the inner tube, the strips appearing as a closed layer, including the steps of:
   a. extruding the thermoplastic or elastomeric material from an annular nozzle to form the inner tube 2,
   b. encircling the extruded inner tube with a closed layer of the strips (6), which are at least coated with heat-activatable adhesive material and which extend in the axial direction of the inner tube,
   c. subjecting the inner tube (2) to a relatively low internal pressure (3) while passing the inner tube and the closed layer of thin strips through a sizing guide 5, while supplying heat at the entrance of the guide, thereby expanding the tube against the strips and the strips against the guide, the heat at the guide entrance being effective to activate the adhesive and bond the tube to the layer of strips, the guide being long enough to cool the tube and strips sufficiently so that they set as an integral structure,
   d. winding a second layer of strips (10) of heat activatable adhesive material spirally over the first layer bonded to the inner tube and bonding the second layer to the first layer by heating,
   e. passing the tube with the connected layers of strips through pinching rolls to close the tube and thereby maintain the tube upstream from the rolls at said relatively low internal pressure, said rolls being also effective to drive the tube and the layers of strips bonded thereto, and
   f. finally subjecting the reinforced inner tube (14) to a relatively high internal pressure (13) and applying to it the outer sheath (20).

2. A process as claimed in claim 1, including, after the passage through the pinching rolls, the step of winding a third layer of strips spirally onto the second layer of strips in an opposite direction to the second layer.

3. A process as claimed in claim 1, including the step of heating the third layer of strips to bond it to the second layer.

4. A process as claimed in claim 1, including the step of coating the strips (6,10) on both sides with adhesive.

5. A process as claimed in claim 1, wherein the temperature range for the adhesive capacity of the adhesive used to produce or to coat the strips (6) (130°–150° C.) includes the temperature which the inner tube (2) possesses when it emerges from an extrusion nozzle (11).

6. A process as claimed in claim 5, including the step of coating the strips (6) with an adhesive having an adhesive strength which is reached at 110° C.

7. A process as claimed in claim 1, including the step of extruding the outer sheath (20) over the inner tube (14) reinforced with the strips (6,10).

8. A process as claimed in claim 1, including the steps of winding a supporting spiral (15) with an axial distance (16) between the individual turns, onto the inner tube (14) reinforced with the strips (6,10), and bonding the supporting spiral firmly to the reinforced inner tube (14).

9. A process as claimed in claim 8, including the steps of bonding the supporting spiral (15) to the reinforced inner tube (14) and also to the outer sheath (20) extruded over it.

10. A process as claimed in claim 8, including the step of applying to the supporting spiral strips (21) reinforced with textile threads and which are made from an adhesive or are provided with an adhesive, said strips (21) being applied in an axial direction between the supporting spiral (15) and the outer sheath (20), said strips (21) bonding the supporting spiral to the outer tube (29).

11. A process as claimed in claim 10, wherein the strips (21) are applied tautly to the supporting spiral (15).

12. Use of a tube produced by the process as claimed in claim 1, through the inner tube (14) of which a first medium is conveyed, for conveying a second medium through the spiral cavity (23) between the sides of the supporting spiral (15), the reinforced inner tube (14) and the reinforced outer sheath (20,21).

* * * * *